J. B. G. M. F. PIRET.
Car-Axle Boxes.
No. 5,775. Reissued Feb. 24, 1874.
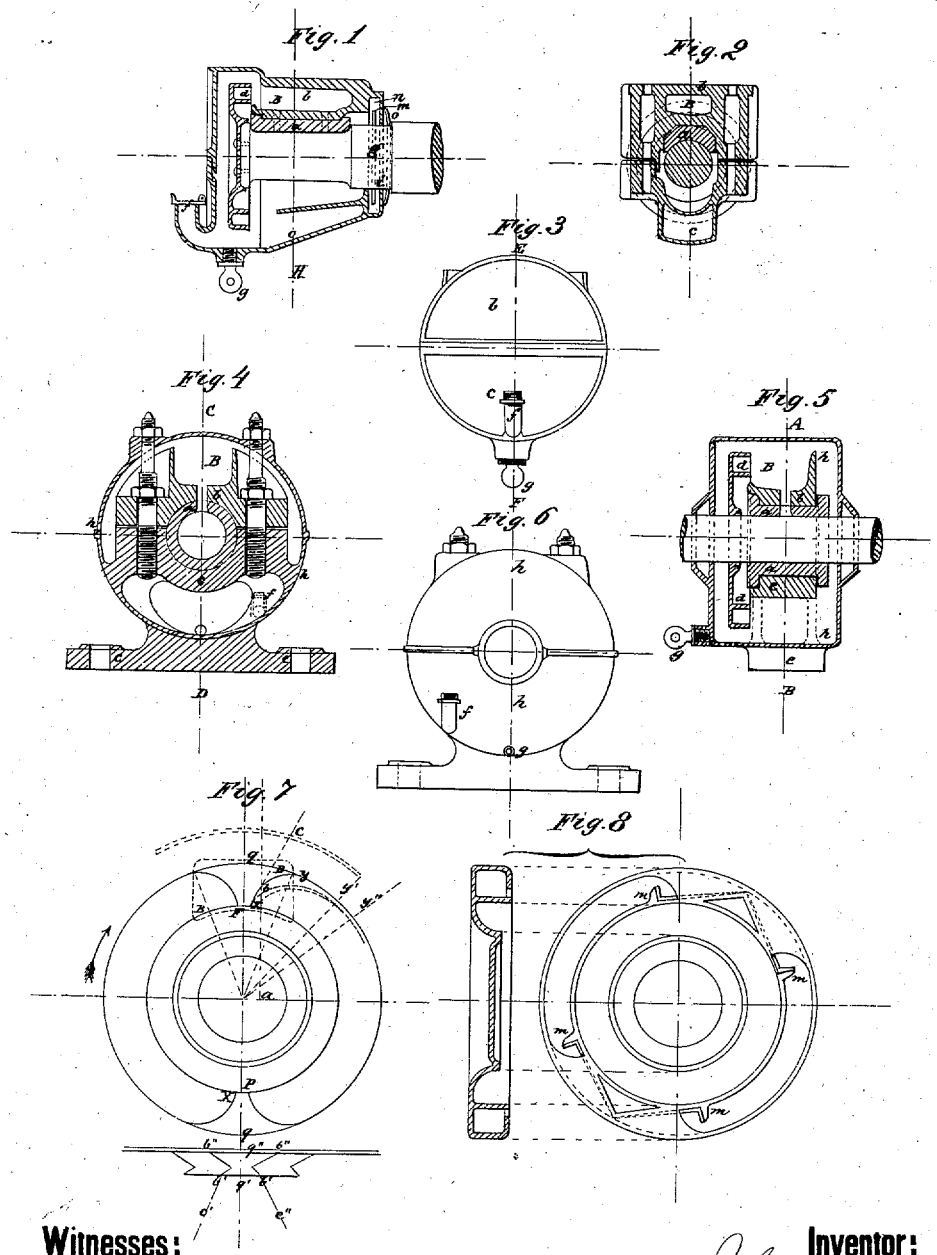
Witnesses:
A. W. Almqvist
C. Sragnick
Inventor:
J. B. G. M. F. Piret
Per
Attorneys.

UNITED STATES PATENT OFFICE.

JEAN B. G. M. F. PIRET, OF NEW YORK, N. Y., ASSIGNOR TO THE PIRET LUBRICATING BOX COMPANY, OF SAME PLACE.

IMPROVEMENT IN CAR-AXLE BOXES

Specification forming part of Letters Patent No. 105,977, dated August 2, 1870; reissue No. 5,775, dated February 24, 1874; application filed January 24, 1874.

*To all whom it may concern:*

Be it known that I, JEAN B. G. M. F. PIRET, of the city, county, and State of New York, have invented a new and useful Improvement in Lubricating Apparatus for Axle and Journal Boxes, of which the following is a specification:

This invention relates to certain improvements in the construction and arrangement of the axle and journal boxes for which Letters Patent of the United States, numbered 38,760, were granted to me on the 2d day of June, 1863.

The present invention consists more particularly in a novel construction of winged lubricating-wheel, and in the application to the axle-box of a reservoir under the axle. It also consists in a novel construction of means for preventing the escape of the oil at the inner end of the box.

Figure 1 represents a longitudinal section of an axle-box provided with my improvement. Fig. 2 is a vertical transverse section of the same. Fig. 3 is a front view of the same. Fig. 4 is a vertical transverse section of a bracket or pillow-block provided with my improvement. Fig. 5 is a longitudinal section of the same. Fig. 6 is a front view of the same. Fig. 7 is a face view with a sectional edge view of the lubricating-wheel for fast trains. Fig. 8 is a face view and transverse section of the wheels for slow trains.

Similar letters of reference indicate corresponding parts.

*a* is the upper bearing or plummer-block; *b*, the upper part of the box; *c*, the lower part of the same. *d* is the lubricating-wheel, mounted on the end of the axle. The lower part of the axle-box forms, at its lower end, a reservoir, H, for the lubricating material, which reservoir is supplied through a nozzle, *f*, and emptied through a discharge-opening, *g*.

The lubricating-wheel, dipping into the reservoir, has its buckets filled with the liquid, and discharges the same into a chamber, B, provided in the upper part of the axle-box. From this chamber it drops through one or more apertures, which are shown in the drawing, upon the revolving axle, lubricating the same.

The wheel *d*, instead of having the buckets projecting from its edge, has the same arranged on its inner face, on which plan they can be made with less difficulty and expense.

For axles used on fast trains, I prefer to use the buckets in the form shown in Fig. 7, being curved ribs or projections with curved edges.

For slow trains, the wheel is to be made as in Fig. 8, with projecting stops *m* in front of the buckets to prevent the too voluminous discharge of the liquid upon the axle.

For preventing the escape of the oil from the inner end of the box, also for preventing the dust and cinders from entering the box, I now propose to employ a washer, *m*, on the axle within an annular space, *n*, formed in the inner end of the parts *b* and *c* of the box, said washer being forced or fixed on the axle, so as to turn with it, and by its centrifugal action keep the oil away from the joint; also another washer, *o*, on the axle outside of the box and bearing snugly against the box, said washer being also forced or fixed on the axle so as to turn with it, and by its centrifugal action throw the dust, &c., away from the joint. By preference, this outer washer will be slightly concave on the side next to the box to bear at the edge only, and it may press gently against the box by the action of a collar of the axle behind it.

Having thus described my invention, I claim as new and desire to secure by Letters Patent—

1. The lubricating apparatus consisting essentially of the wheel *d*, provided with buckets that project from its inner face, the reservoir H, and the chamber B, all combined to operate substantially as set forth.

2. The revolving washer *m*, in an annular chamber, *n*, in the inside of the axle-box, and the revolving washer *o* outside thereof, in combination with the axle and the box, substantially as specified.

3. The combination of collars *m* and *o* with the axle-box and a lubricating-wheel, all substantially as and for the purpose specified.

JEAN B. G. M. F. PIRET.

Witnesses:

N. VAN SUYCK,

LOUIS L. ANGELL.